// United States Patent [15] 3,660,786
Senf [45] May 2, 1972

[54] COMPENSATED DELAY LINE

[72] Inventor: George A. Senf, Williamstown, Mass.
[73] Assignee: Sprague Electric Company, North Adams, Mass.

[22] Filed: Aug. 20, 1970
[21] Appl. No.: 65,458

[52] U.S. Cl. .......... 333/29, 333/31
[51] Int. Cl. .......... H03h 7/32
[58] Field of Search .......... 333/29, 18, 31

[56] References Cited

UNITED STATES PATENTS

| | | | |
|---|---|---|---|
| 2,791,752 | 5/1957 | Fredenall | 333/29 X |
| 3,537,007 | 10/1970 | Guanella | 333/29 X |
| 3,543,192 | 11/1970 | Rowe et al. | 333/29 |
| 3,436,687 | 4/1969 | Andrew, Jr. et al. | 333/29 |
| 2,598,683 | 6/1952 | Golay | 333/29 |

OTHER PUBLICATIONS

" The Compensation of Delay Distortion in Video Delay Lines" by Sommer et al., September 1950, pp. 1036– 1040, IRE Proceedings, Vol. 38, No. 9

" A New Approach in the Design of Unequalized Filters and Delay Lines" by Levy, May 1953, pp. 317– 320, Journal of the British Institution of Radio Engineers, Vol. 12 Issue 5

*Primary Examiner*—Herman Karl Saalbach
*Assistant Examiner*—Saxfield Chatmon, Jr.
*Attorney*—Connolly and Hutz and Vincent H. Sweeney

[57] ABSTRACT

A delay line having additional compensation for output phase distortion and output pulse top ringing which includes a first feedback capacitor connected to the input lead and bridging the first three inductive coil sections of the delay line, with a series of successive feedback capacitors connecting each consecutive coil interconnection point and bridging the three inductive coil sections immediately following the coil interconnection point.

5 Claims, 4 Drawing Figures

COMPENSATED DELAY LINE

BACKGROUND OF THE INVENTION

This invention generally relates to delay lines having feedback capacitors, and more particularly to delay lines having at least one feedback capacitor bridging the first three sections of delay line so as to achieve a minimum phase distortion and an optimized pulse top ringing for the output signal waveform.

Delay lines have been compacted and miniaturized in the past, primarily through the use of printed capacitors. In order to maintain the same design parameters for a compact delay line structure, it becomes necessary to increase the diameter of the inductance coil with a corresponding decrease in the distance between coil section windings, thereby resulting in excessive magnetic coupling and increased phase distortion. Prior art methods of compensating for phase distortion have involved the use of capacitors bridging individual inductive coil sections of the delay line. The disadvantage to this method however, is that it invariably affects the frequency response of the output waveform and increases the risetime for the output signal.

Other inherent problems which have constantly plagued delay line designers, include ringing on the top of the output pulse waveform and pre-pulse base-line distortion, each of which detracts from an accurate integration of the area within the envelope of the waveform. Prior art techniques of compensating for ringing and pre-pulse distortion, however, have also invariably affected the frequency response and risetime of the output signal.

Therefore it is an object of this invention to overcome the above-mentioned disadvantages of the prior art by providing a simplified means of compensating for both phase distortion and ringing without any substantial change in output frequency response and risetime.

It is also an object of this invention to provide a compact and simplified delay line structure having equivalent characteristics, heretofore achieved only in delay lines of much larger size.

It is an even further object of this invention to provide a simplified means for balancing the maximum positive and negative backswings of the inherent pulse top ringing in the output signal of a delay line, thereby providing for a more accurate integration of the area within the envelope of the output waveform.

It is also an object of this invention to provide a simplified means for adjusting the positive backswing of the pre-pulse distortion at the output waveform of the delay line.

These and other objects of the invention will be apparent from the following specification and figures.

SUMMARY OF THE INVENTION

A delay line formed in accordance with this invention, generally consists of a plurality of inductive coil sections in series connection with input and output leads, and a plurality of capacitor sections, each connected from one of the coil connections to the other side of the line, with additional compensation for output phase distortion and pulse top ringing provided by a series of feedback capacitors. The feedback capacitors are arranged so that each one bridges three inductive coil sections at a time, wherein the first feedback capacitor is connected to the input lead and bridges the first three inductive coil sections of the line, with each successive feedback capacitor connecting to each consecutive coil connection and bridging the three inductive coil sections immediately following the coil connection.

More particularly, the capacitor sections include a dielectric sheet having a single conductive element deposited on one surface and separate conductive elements deposited on the opposite surface. The elements act as electrodes with the dielectric therebetween, to form individual capacitor sections. A number of such consecutive capacitor sections starting with the first, are arranged so that part of the edge surface of the electrode of each capacitor section so arranged, is in close capacitive coupling relation, with part of the edge surface of the electrode of the third succeeding capacitor establishing a distributed capacitance therebetween which acts as a feedback capacitor, wherein the feedback capacitors consecutively bridge three sections of delay line.

DESCRIPTION OF THE PREFERRED EMBODIMENTS

Figure 1:
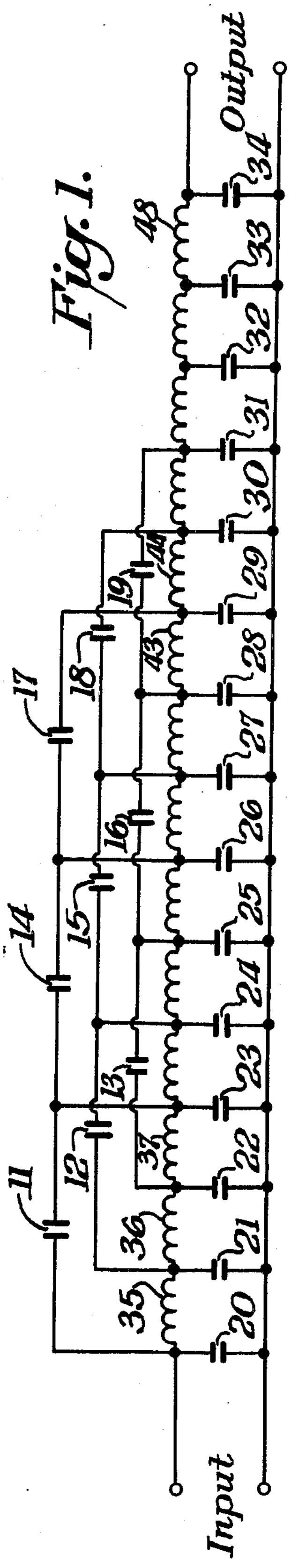
FIG. 1 is a schematic circuit diagram of the delay line of this invention.

Referring more specifically to FIG. 1, the schematic circuit diagram of the preferred embodiment of the delay line of the invention is shown. The delay line consists of a series of inductances and capacitors, which when combined in the manner shown by the circuit diagram in FIG. 1 will produce a time delay in an input signal. The quality of the output signal and the total time of delay are a function of the individual inductance-capacitance sections of the line.

In general the individual section inductances, 35 through 48, are adjusted so as to be of equal value along with the individual section capacitors, 21 through 33, thereby maintaining the quality of the output. The input and output capacitors, 20 and 34, are approximately half the value of the other capacitors for electrical matching purposes. The values of the individual section inductors and capacitors are determined by the delay line parameters. The total delay of the line is a direct function of the delay per section which is proportional to the product of inductance and capacitance $$D=\sqrt{LC}$$

$D$ = delay per section in seconds $L$ = inductance of each section coil in henries $C$ = capacitance of each section capacitor in farads.

Figure 2:
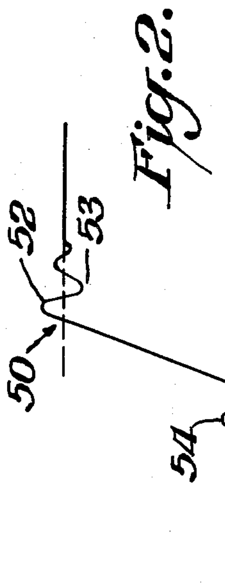
FIG. 2 is a pictorial representation of a typical output pulse waveform for a delay line.

FIG. 2 illustrates a typical output signal waveform for a delay line. The output pulse waveform includes the characteristic pulse top ringing 50, together with the pre-pulse base-line distortion 51. The maximum negative backswing of both the pulse top ringing 50 and the pre-pulse base-line distortion 51 are designated at 53 and 55 respectively, while the maximum positive backswing of both the pulse top ringing 50 and the pre-pulse base-line distortion 51 are designated at 52 and 54 respectively. It is desirable that the maximum positive and negative backswings for both the pulse top ringing 50 and the pre-pulse base-line distortion be of almost equal value, thereby achieving an integrated area within the envelope of the pulse form that very nearly approximates the area of the ideal square wave. The maximum positive and negative backswings for both the pulse top ringing and the pre-pulse base-line distortion may be reduced and equalized by the addition of feedback capacitors, 11 through 19, each one of which consecutively bridges three sections of the delay line.

If only the pulse top ringing were of primary concern, then the maximum positive and negative backswings could be reduced and balanced by the addition of only one feedback capacitor of approximately 10 percent the value of the individual section capacitors and bridging the first three sections of delay line. However, this would cause a large positive backswing in the pre-pulse base-line distortion, and therefore, it has been found more suitable to use smaller value feedback capacitors, and to spread the feedback capacitance out in the manner shown in FIG. 1. This results in a better equalization of the maximum negative and positive backswings in the pre-pulse base-line distortion. The primary advantage to using feedback capacitors bridging three sections of delay line at a time that the output frequency response and risetime are maintained constant, which cannot be achieved by other known methods of compensation.

While we do not intend to be bound by any particular theory of operation, it is believed that the additional feedback capacitors consecutively bridging every three sections of the delay line, substantially reduces the effective pulse top ringing for the following reasons. Pulse top ringing is a function of the resonant frequency of the delay line, and the resonant frequency of the delay line is a function of the value of the line components $$Fr=\frac{1}{2\pi\sqrt{LC}}$$

$Fr$ = resonant frequency
$L$ = inductance of each section coil in henries
$C$ = capacitance of each section capacitor in farads. However, as previously discussed the delay for each section of the line is equal to $\sqrt{LC}$ and the period of resonant frequency is equal to $2\pi\sqrt{LC}$, or $2\pi x$ (the delay per section). Therefore, a phase shift of 180° in the resonant frequency would be equivalent to $\pi x$ (the delay per section) resulting in a phase shift of 180° in the resonant frequency for every $\pi$ sections of delay line. Consecutively bridging every $\pi$ sections of delay line by means of feedback capacitors would cause a near perfect cancellation of the resonant frequency component of the output signal, with a corresponding reduction in the pulse top ringing.

As a practical matter, it is inconvenient to bridge $\pi$ sections of delay line with a feedback capacitor, because it would necessitate making additional connections to the inductance coil sections. Therefore, the preferred structure of this invention includes feedback capacitors consecutively bridging every three sections of delay line, resulting in a near cancellation of the resonant frequency component. The number of feedback capacitors may vary according to the acceptable level of positive backswing in the pre-pulse base-line distortion. Only one feedback capacitor 11 bridging the first three sections of the line may be sufficient to effect the required compensation in pulse top ringing providing the large positive backswing on the pre-pulse base-line distortion is acceptable.

Figure 3:
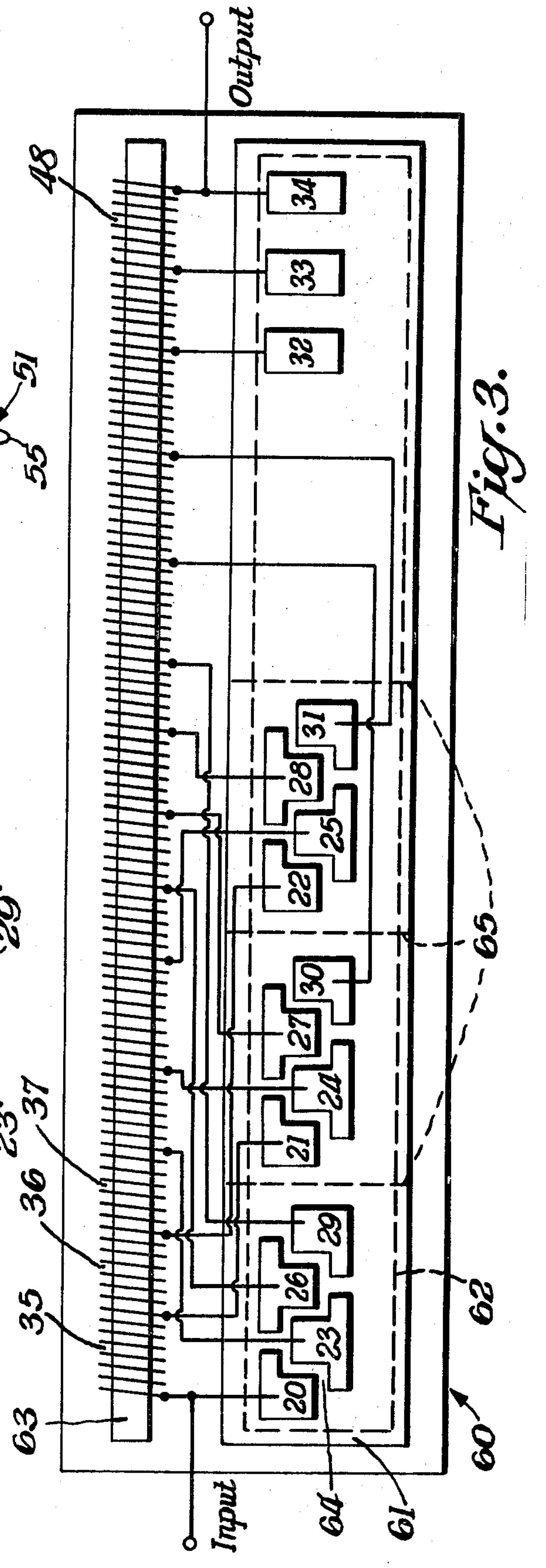
FIG. 3 is a view of an embodiment of the delay line of the present invention.

FIG. 3 shows a delay line formed in accordance with the schematic circuit diagram of FIG. 1. The preferred embodiment includes a dielectric substrate 61, a plurality of conductive segments or separated coatings, 20 through 34, which are printed on top of the dielectric plate 61, and an underlying conductive ground plane 62, printed on the bottom surface of dielectric plate 61. The inductance coil sections 35, 36, 37 etc. are mounted on any convenient mounting means such as rod 63. The rod 63 and dielectric plate 61 are preferably mounted on the plate 60 in a convenient manner. Each one of the capacitor plates, 20 through 34, is connected by means of conductive taps between each inductive coil section, 35 through 48, in the manner shown in FIG. 3.

The capacitors, 20 through 34, may be constructed by any of the circuit printing methods such as photo-etching, electrodepositing, silk screening and etching, painting with conductive paint, foil pattern laminating etc. In general any method is acceptable whereby two plates of conductive material are separated by dielectric plate 61. The dielectric substrate may be made of any of the well known plastics, ceramics, mica, treated paper, etc. but must be chosen properly for the particular application of the delay line. On high frequency work and output quality, materials with low dissipation factors are required. Preferably the capacitors, 20 through 34, and the ground plane 62 are silvered deposits and may be adjusted, if so required, to a desired capacitance by any preferred method such as modifying the area of each segment while testing an appropriate coil section.

The feedback capacitors, 11 through 19, are provided by arranging the individual capacitor plates, 20 through 31, in close proximity so as to establish a distributed capacitance therebetween. For instance, the feedback capacitor 11 connecting the delay line section capacitors 20 and 23, is determined by the distributed capacitance 64 in the area directly between capacitor plates 20 and 23 as shown in FIG. 3. The distributed capacitance depends upon the closeness of the capacitor electrodes, the length of the edge surfaces of the electrodes that are in close capacitive relation to each other, the thickness of the dielectric base 61 and the dielectric constant. The distributed capacitance between the capacitor electrodes may be adjusted by varying any of the above mentioned parameters. As can be seen from FIG. 3, the delay line section capacitors 20 through 31 are not disposed in numerical sequence as in conventional delay lines, but instead, are arranged so that every third capacitor in the delay line will be in close capacitive relation to each other, thereby establishing a distributed capacitance between every third delay line capacitor.

It is preferred that the consecutive bridging of every three sections of delay line not be spread out for the length of the delay line. As previously mentioned, the desired adjustment in pulse top ringing may be accomplished by only one feedback capacitor bridging the first three sections of delay line, and of approximately 10 percent the value of the delay line sectional capacitors. However, there are advantages, particularly in regard to achieving an optimum pre-pulse base-line distortion, to spreading out the feedback capacitance by using a series of smaller feedback capacitors arranged as shown in FIG. 1. The individual feedback capacitors when added together, should have a total value equal to the single feedback capacitor (approximately 10 percent of the value of the delay line sectional capacitors). However, there are practical limitations as to the extent that the feedback capacitors may be spread out, and it would be undesirable to use so many feedback capacitors, that each one would have a value of less than 2 pf. In fact, it has been found preferable to use feedback capacitors having values in the order of 2 to 4 pf. It should be understood that though it is not generally preferred to lump together all the feedback capacitance in one initial feedback capacitor because of the substantial increase in the positive backswing of the pre-pulse base-line distortion 51; it still would be within the scope of the invention to do so and might even be preferred for some limited and special design application.

From FIGS. 1 and 3 it can be seen that beyond the last section of delay line to be bridged, the capacitors 32, 33, 34 etc. are connected to coil sections 46, 47, 48 respectively by conventional means as shown in the drawings. The first 12 sectional delay line capacitors, 20 through 31, are not disposed adjacent their respective taps in the inductive coil, thereby necessitating the cross wiring pattern as shown in FIG. 3 in order to achieve the respective connections.

The introduction of feedback capacitors modifies the upper end of the pass band thereby effecting a substantial improvement in the phase distortion, especially for low pass delay lines. The delay line of FIG. 3 would preferably be arranged in a stacked structure with the individual segments cut along dotted lines 65 and stacked together with insulating spacers therebetween. The first dielectric layer includes the first capacitor section and every succeeding third capacitor section thereafter, the second dielectric layer includes the second capacitor section and every succeeding third capacitor section thereafter and the third dielectric layer includes the third capacitor section and every succeeding third capacitor section thereafter. This provides a very compact delay line structure, substantially reducing the lateral area taken up by conventional delay lines. In order to maintain the same conventional design parameters, for this compact structure, it is required that the diameter of the inductance coil be increased with a corresponding decrease in the distance between coil section windings, thereby resulting in excessive magnetic coupling and increased phase distortion. The introduction of feedback capacitors, however, modifies the phase distortion, thereby making possible a very compact delay line of practical value.

Figure 4:
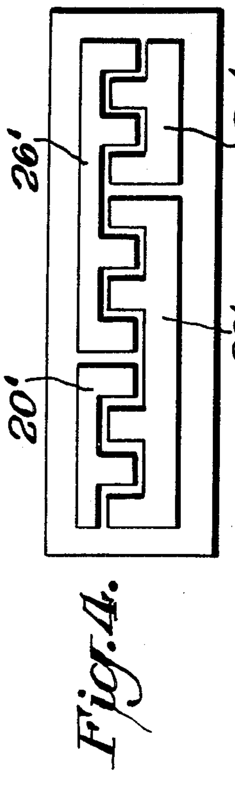
FIG. 4 is a view of a modification that may be incorporated into the delay line of FIG. 3.

FIG. 4 illustrates an alternate configuration for arranging electrodes so as to increase the distributed feedback capacitance therebetween, by increasing the length of the edge surfaces of the electrodes that are in capacitive relation to each other. This would be equivalent to increasing the overall capacitance of a more conventional type capacitor by increasing the electrode area.

Although incorporating feedback capacitors into a delay line is most conveniently effected by arranging the delay line capacitor sections in close capacitive coupling relation to each other, so as to establish a predetermined value of distributed capacitance therebetween, the scope of the invention is not believed to be so limited, and may include any means by which the feedback capacitors may be incorporated into the delay line, such as by actually adding individual feedback capacitors to the line. Suitable feedback capacitors in the range of 2 to 4 pf may be formed by twisting together two ends of an enameled magnet wire, and encapsulating in an epoxy or coating with a varnish. Feedback capacitors formed in this manner could then be connected across consecutive sections of a conventional style delay line in the manner illustrated in FIG. 1.

EXAMPLE

One particular delay line was formed in a conventional manner, not including feedback capacitors. The delay line was designed to include a total of 26 sections, with the capacitor sections and inductance coil sections selected for an overall delay of 312 N sec. The capacitor sections were of mica each having a value of 126 pf. The delay line was further designed for a characteristic impedance of 98Ω with a maximum attenuation of 5 percent. The output risetime for the pulse was measured to be 24 N sec. The pulse top ringing 50 and the pre-pulse base-line distortion 51 were observed for an output signal waveform and the following parameters were measured:

positive backswing pulse top ringing = 2.5 percent of pulse height negative backswing pulse top ringing = 9.0 percent of pulse height positive backswing base-line distortion = 10.2 percent of pulse height negative backswing base-line distortion = 2.9 percent of pulse height.

Next, nine feedback capacitors each having a value of 3 pf were formed by twisting together the ends of enameled magnet wires, and connecting them in the manner, as shown in FIG. 1. The risetime was measured and found to remain constant at 24 N sec. The pulse top ringing 50 and the pre-pulse base-line distortion 51 were again observed and the following parameters were measured:

positive backswing pulse top ringing = 5.2 percent of pulse height negative backswing pulse top ringing = 3.7 percent of pulse height positive backswing base-line distortion = 5.2 percent of pulse height negative backswing base-line distortion = 0 percent of pulse height.

A careful comparison of the data shows that the magnitude of the pulse top ringing has decreased, but even more important is the improved balance between the positive and negative backswings in the pulse top ringing, which provides for a more nearly perfect integration of the area within the envelope of the pulse waveform. The shift in the base-line distortion from a large positive backswing to a reduced positive backswing can also be seen from a comparison of the data.

What is claimed is:

1. A delay line comprising a plurality of inductive coil sections connected in series, an input lead connected to one end of said series and an output lead connected to the other end of said series, a plurality of capacitor sections each connected from one of said series connections to the other side of the line, said capacitor sections including a dielectric sheet having a single conductive element on one surface and a plurality of separate conductive elements on the opposite surface forming individual capacitor sections, the edge surface of each of a plurality of said separate conductive elements being in close capacitive coupling with the edge surface of the third succeeding of said separate conductive elements establishing a distributed capacitance therebetween which acts as a feedback capacitor, each of said distributed feedback capacitors bridges three of said inductive coil sections with the first feedback capacitor connected to said input lead and bridging the first three inductive coil sections of said line, each successive feedback capacitor connected to each consecutive of said coil series connections and bridging the three inductive coil sections immediately following the coil connection.

2. The delay line of claim 1 wherein the total value of said feedback capacitors is approximately 10 percent of the value of one capacitor section and each feedback capacitor has a value in the order of 2 to 4 pf.

3. The delay line of claim 1 wherein said feedback capacitors are ends of enameled magnet wire twisted together.

4. The capacitor of claim 1 wherein the value of distributed feedback capacitance is determined by the length of the edge surface of each plate in capacitive coupling relation.

5. The delay line of claim 4 comprising a stacked structure of three dielectric layers, each insulatively isolated from the other, wherein the first dielectric layer includes the first capacitor section and every succeeding third capacitor section thereafter, the second dielectric layer includes the second capacitor section and every succeeding third capacitor section thereafter, and the third dielectric layer includes the third capacitor section and every succeeding third capacitor section thereafter.

* * * * *